(12) United States Patent
Jeong

(10) Patent No.: US 9,288,758 B2
(45) Date of Patent: Mar. 15, 2016

(54) PORTABLE TERMINAL AND METHOD FOR SCANNING ACCESS POINTS

(71) Applicant: Samsung Electronics Co. Ltd., Suwon-si, Gyeonggi-do (KR)

(72) Inventor: Mijin Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 13/891,848

(22) Filed: May 10, 2013

(65) Prior Publication Data

US 2013/0308512 A1  Nov. 21, 2013

(30) Foreign Application Priority Data

May 17, 2012  (KR) .................. 10-2012-0052289

(51) Int. Cl.
*G08C 17/00* (2006.01)
*H04W 52/02* (2009.01)

(52) U.S. Cl.
CPC ................................ *H04W 52/0225* (2013.01)

(58) Field of Classification Search
USPC ........... 370/311–329, 338–345; 455/552–575
See application file for complete search history.

(56) References Cited

U.S. PATENT DOCUMENTS

| 7,580,397 | B2 * | 8/2009 | Arai et al. | 370/338 |
|---|---|---|---|---|
| 7,916,687 | B2 * | 3/2011 | Deshpande et al. | 370/328 |
| 7,965,675 | B2 * | 6/2011 | Rahim | 370/328 |
| 8,019,296 | B1 * | 9/2011 | Durig | 455/127.4 |
| 8,185,092 | B1 * | 5/2012 | Durig | 455/411 |
| 8,427,942 | B2 * | 4/2013 | Kim et al. | 370/229 |
| 8,514,759 | B2 * | 8/2013 | Yoon | 370/311 |
| 8,570,993 | B2 * | 10/2013 | Austin et al. | 370/338 |
| 8,935,637 | B2 * | 1/2015 | Kim et al. | 715/863 |
| 2012/0220248 | A1 * | 8/2012 | Kanda | 455/150.1 |

* cited by examiner

*Primary Examiner* — Man Phan
(74) *Attorney, Agent, or Firm* — Jefferson IP Law, LLP

(57) ABSTRACT

A portable terminal and a method for scanning Access Points (APs) to perform the AP scan with low power consumption in a sleep mode are provided. The method includes checking whether a sleep mode entry request is detected in a state that a short range radio communication function is activated, transmitting, when the sleep mode entry request is detected, an access point list and a setup command for handing over an access point scan control from a control unit to a short range radio communication module, adjusting a scan period according to a motion of the portable terminal based on the access point list and the setup command, and scanning, at the short range radio communication module, access points at the adjusted scan period.

18 Claims, 3 Drawing Sheets

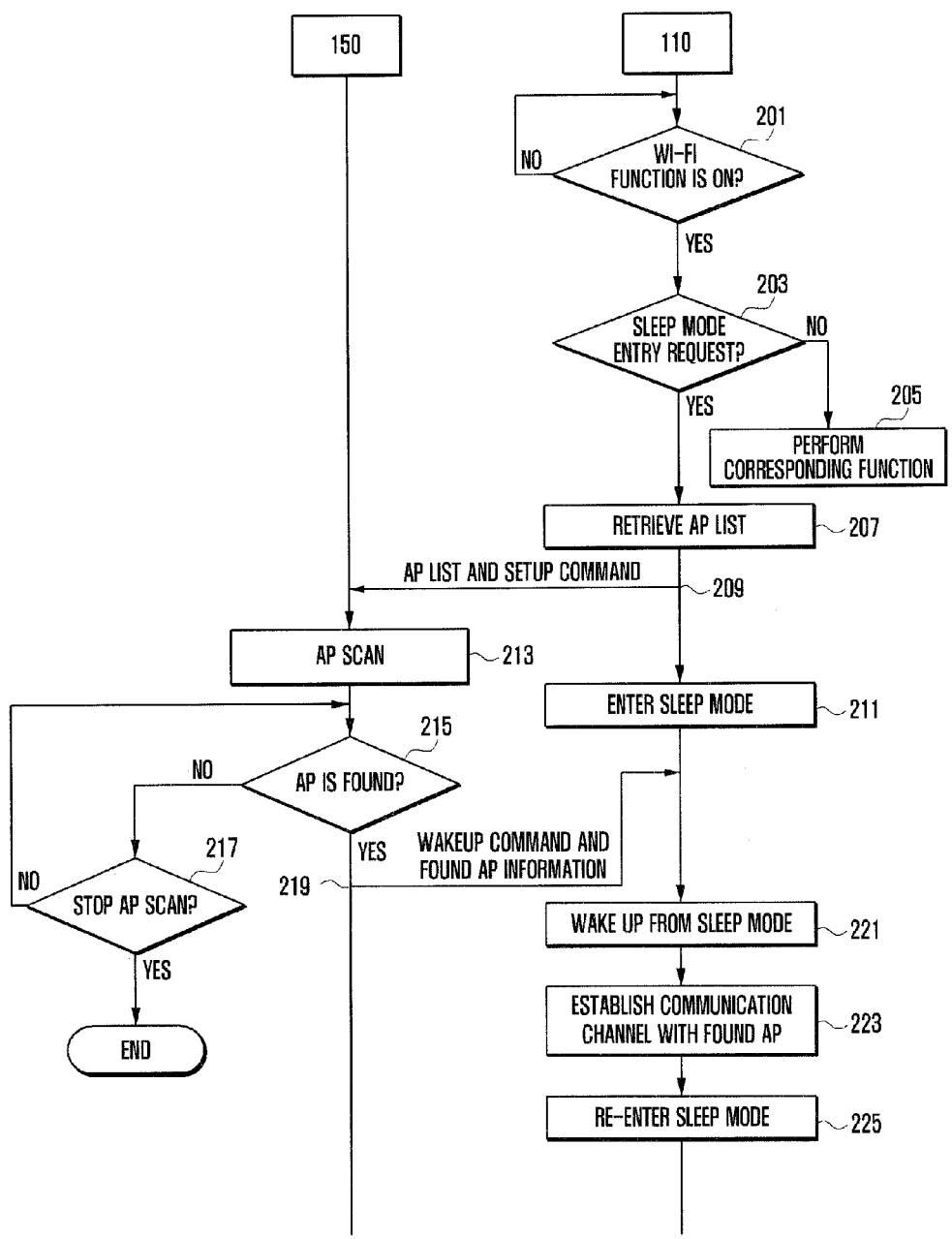

PORTABLE TERMINAL AND METHOD FOR SCANNING ACCESS POINTS

PRIORITY

This application claims the benefit under 35 U.S.C. §119(a) of a Korean patent application filed on May 17, 2012 in the Korean Intellectual Property Office and assigned Ser. No. 10-2012-0052289, the entire disclosure of which is hereby incorporated by reference.

BACKGROUND OF THE INVENTION

1. Field of the Invention:

The present invention relates to an access point scan method and apparatus. More particularly, the present invention relates to a portable terminal and method for scanning Access Points (APs) with low power consumption in a sleep mode.

2. Description of the Related Art:

With the advance of information processing and semiconductor technologies, portable terminals are becoming powerful devices and widespread in today's living environment. These portable terminals (e.g. mobile phones) include lots of functions such as voice call functions, music player functions, text messaging functions, digital broadcast receiver functions, short range radio communication functions, and internet access functions. With the integration of diverse functions, the battery life of the portable terminal is becoming an important issue.

Meanwhile, the short range radio communication function is the function for use of Internet access service through a communication channel established with an Access Point (AP). In order to use the Internet access service, the portable terminal has to perform AP scan to discover APs around it when it powers on or the current communication channel is broken. The AP scan process is performed by the main process of the portable terminal at an AP scan period even when the portable terminal enters the sleep mode in the state where the short range radio communication function is activated (on). As aforementioned, the related art portable terminal is configured such that the main processor wakes up from the sleep mode to perform AP scan at the AP scan period, resulting in increase of power consumption. There is therefore a need of a method for reducing unnecessary power consumption for AP scan of the portable terminal in the sleep mode.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and provide at least the advantages described below. Accordingly, an aspect of the present invention is to provide a portable terminal and method for scanning APs capable of reducing unnecessary power consumption for AP scanning in the sleep mode.

Another aspect of the present invention is to provide a portable terminal and method for scanning APs capable of reducing unnecessary power consumption such that the short range radio communication module performs AP scan on behalf of the main processor when the portable terminal is in the sleep mode.

Another aspect of the present invention is to provide a portable terminal and method for scanning APs capable of reducing unnecessary power consumption by monitoring the motion of the portable terminal in the sleep mode through an acceleration sensor and setting a relatively short AP scan period for the motionless portable terminal and setting a relatively long AP scan period for the moving portable terminal.

Another aspect of the present invention is to provide a portable terminal and method for scanning APs capable of reducing unnecessary power consumption by setting a relatively short AP scan period at a location within the coverage of the AP to which the portable terminal has connected before the entry of the sleep mode and a relatively long AP scan period at a location out of the coverage of the AP to which the portable terminal has connected before the entry of the sleep mode.

In accordance with an aspect of the present invention, an access point scan method of a portable terminal is provided. The method includes checking whether a sleep mode entry request is detected in a state that a short range radio communication function is activated, transmitting, when the sleep mode entry request is detected, an access point list and a setup command for handing over an access point scan control from a control unit to a short range radio communication module, adjusting a scan period according to a motion of the portable terminal based on the access point list and the setup command, and scanning, at the short range radio communication module, access points at the adjusted scan period.

In accordance with another aspect of the present invention, a portable terminal is provided. The portable terminal includes an input unit which receives a short range radio communication function on/off signal, a storage unit which stores an access point list including information on access points to which the portable terminal has connected previously, a control unit which transmits, when the sleep mode entry request is detected in a state that a short range radio communication function is activated, the access point list and a setup command for handing over an access point scan control and re-enters the sleep mode, a motion sensor which detects a motion of the portable terminal, and a short range radio communication module which adjusts, when the access point list and the setup command are received, a scan period according to the motion of the portable terminal based on the access point list and the setup command and scans access points at the adjusted scan period.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 2 is a flowchart illustrating the AP scan method of the portable terminal according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

Figure 1:
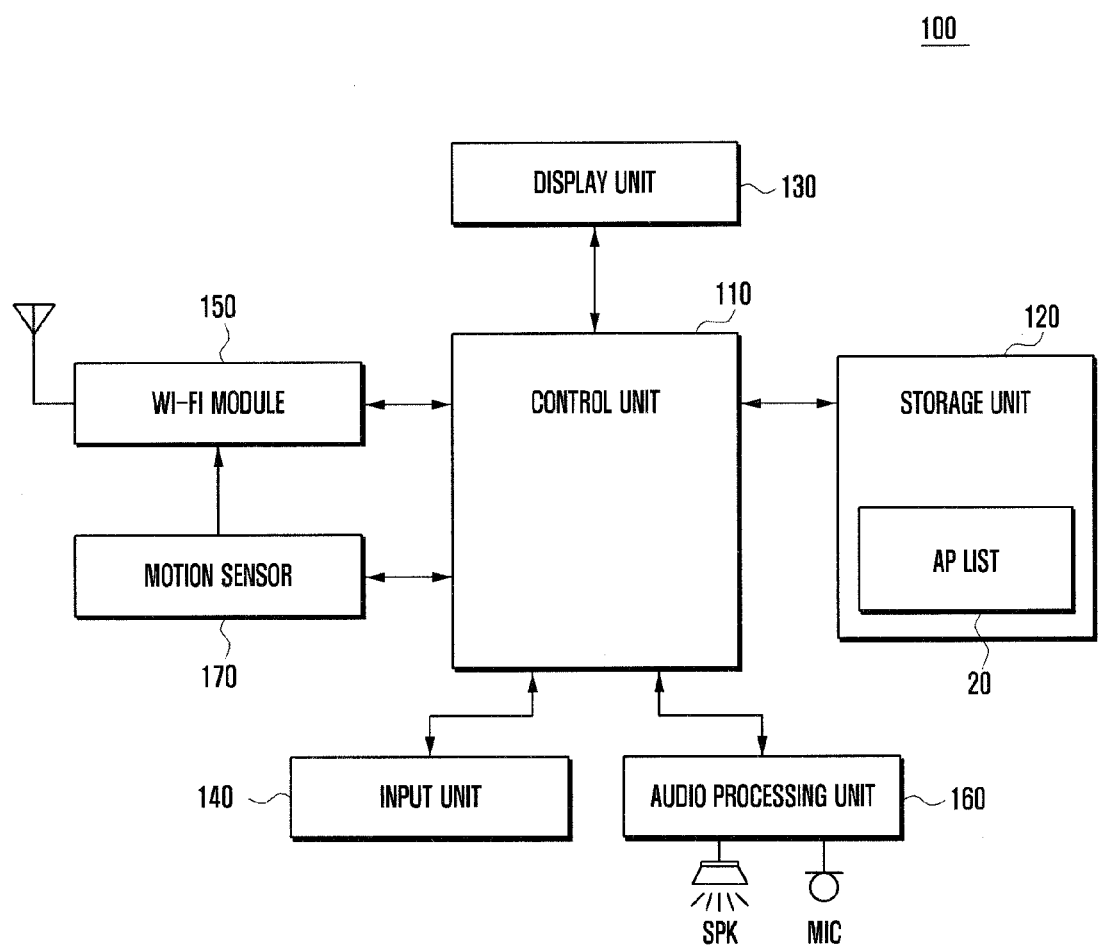
FIG. 1 is a block diagram illustrating the configuration of the portable terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The specification and drawings are to be regarded in an illustrative rather than a restrictive sense in order to help understand the present invention. It is obvious to those skilled in the art that various modifications and changes can be made thereto without departing from the broader spirit and scope of the invention.

In the following description, the portable terminal can be any of short range radio communication function-enabled devices including mobile communication terminal, Personal Digital Assistant (PDA), Smartphone, Tablet Personal Computer (PC), laptop PC, Netbook, Ultra Mobile Personal Computer (UMPC), etc.

The portable terminal according to an exemplary embodiment of the present invention is characterized in that, when the portable terminal enters the sleep mode in the state that the short range radio communication function is active (on), the short range radio communication module performs AP scan on behalf of the processor. In this case, when the portable terminal enters the sleep mode, the processor is capable of transferring an AP list and a setup command to the short range radio communication module. The setup command is the command to hand over the AP scan control to the short range radio communication module and includes AP scan period and AP scan end time.

The description is directed to the portable terminal equipped with a Wi-Fi module as the short range wireless radio communication module. However, exemplary embodiments of the present invention are not limited thereto. For example, exemplary embodiments of the present invention can be applied to the portable terminals equipped with any type of short range radio communication module.

FIG. 1 is a block diagram illustrating the configuration of the portable terminal according to an exemplary embodiment of the present invention.

Referring to FIG. 1, the portable terminal according to an exemplary embodiment of the present invention comprises a motion sensor 170, an audio processing unit 160, a Wi-Fi module 150, an input unit 140, a display unit 130, a storage unit 120, and a control unit 110. The storage unit 120 may include an Access Point (AP) list 20.

The audio processing unit 160 is capable of including audio components for encoding and decoding audio signals. The audio processing unit 160 is capable of including codecs and audio amplifier (Amp). The audio processing unit 160 is connected to a microphone (MIC) and a speaker (SPK) so as to convert the analog audio signal input through the microphone (MIC) to digital audio signal to generate audio data and send to the control unit 110 and converts the digital audio signal input by the control unit 110 to an analog audio signal to output an audio sound wave through the speaker (SPK). The audio processing unit 160 is capable of outputting various audio signals generated in the portable terminal 100 through the speaker (SPK). For example, the audio processing unit 160 is capable of outputting the audio signals generated according to MP3 file or motion picture playback and sound effect alarming discovery of APs through the speaker (SPK).

The motion sensor 170 is capable of sensing the motion of the portable terminal 100. The motion sensor 170 includes a gravity sensor, a geomagnetic sensor, a gyro sensor, an acceleration sensor, etc. capable of detecting the motion, movement speed and/or direction of the mobile terminal Particularly in an exemplary embodiment of the present invention, the motion sensor 170 is capable of detecting the motion of the portable terminal 100 to generate a signal corresponding to the motion of the portable terminal 100 and send the generated signal to the Wi-Fi module 150 when the portable terminal 100 enters the sleep mode. Although the motion sensor 170 it is depicted as an independent component in FIG. 1, the motion sensor 170 is not limited to such configuration. For example, the motion sensor 170 can be integrated into the Wi-Fi module 150 or to another component of the portable terminal 100.

The Wi-Fi module 150 is a component responsible for establishing a communication channel with an AP for radio communication. Particularly in an exemplary embodiment of the present invention, the Wi-Fi module 150 is capable of receiving the AP list 20 and setup command from the control unit 110 when the portable terminal 100 enters the sleep mode. The AP list 20 includes the APs to which the portable terminal 100 has connected previously. The AP list 20 may include the information on the individual APs (e.g. Service Set Identifier (SSID), authentication number, etc.). The AP list 20 may include the AP information on the APs as many as a predetermined number of APs (e.g. 16). The setup command may include the AP scan period and AP scan end time. The AP scan period may increase exponentially (i.e. 1, 2, 4, 8, . . . , N seconds). The AP scan end time can be expressed a number of scan times. That is, the Wi-Fi module 150 is capable of scanning APs at the AP scan period increasing exponentially and ends the AP scan if no AP is found in the predetermined number of scanning times (e.g. 8 times). The AP scan period and AP scan end time can be set differently according to the system designer's intention.

In the setup command is received, the Wi-Fi module 150 is capable of scanning adjacent APs at the AP scan period. If at least one connectable AP is found as a result of the scan, the Wi-Fi module 150 is capable of transferring a wakeup command and information on the found AP to the control unit 110. If no connectable AP is found before the AP scan end time, the Wi-Fi module 150 is capable of terminating the AP scan procedure.

The Wi-Fi module 150 is capable of estimating the location of the portable terminal 100 based on the motion information received from the motion sensor 170 in the sleep mode. That is, the Wi-Fi module 150 checks whether any motion of the portable terminal 100 in the sleep mode is detected and, if any motion is detected, determines whether the portable terminal 100 is in the coverage of the AP to which the portable terminal 100 has connected before entering the sleep mode. The Wi-Fi module 150 is capable of adjusting the AP scan period according to the determination result. For example, the Wi-Fi module 150 performs AP scanning at the first period (default period) in the case that the portable terminal 100 is moving within the coverage of the AP, at the second period (e.g. two-fold of the first period) in the case that the portable terminal 100 is moving out of the coverage of the AP, and at the third period (e.g. two-fold of the second period) in the case that the portable terminal 100 is motionless. If the portable terminal 100 is motionless, the probability in which the portable terminal 100 maintains the connection to the AP is increased and thus it is preferred to increase the scan period so as to reduce unnecessary AP scan power consumption. If the portable terminal 100 moves within the coverage of the AP, it is preferred to increase the scan period to some extent for quick reconnection to the same AP from abnormal connection breakage. If the portable terminal 100 moves out of the coverage of the AP, it is preferred to elongate the scan period from the view point of power consumption because there may be no connectable AP.

If the setup command is received in the state that the portable terminal 100 is maintaining the communication channel with a specific AP (i.e. the portable terminal has connected to the AP), the Wi-Fi module 150 maintains the connection to the AP and, upon detection of AP connection release, performs the AP scan process.

The input unit 140 includes a plurality of alphanumeric keys for receiving user input such as alphanumeric data and function keys for configuring and executing various functions of the portable terminal 100. Particularly in an exemplary embodiment of the present invention, the input unit 140 is capable of generating a Wi-Fi on/off signal to the control unit 110. The input unit 140 can be configured with at least one of a button keypad, a ball joystick, an optical joystick, a wheel key, a touch key, a touch pad and a touchscreen.

The display unit 130 displays user input data and information provided to the user as well as various menus of the portable terminal 100. That is, the display unit 130 is capable of displaying various execution screens associated with the use of the portable terminal 100 such as idle mode screen (home screen), menu screen, message composition screen, voice call progressing screen, schedule organization screen, phonebook screen, and webpage screen. The display unit 130 is also capable of displaying a Wi-Fi function on/off indicator and an AP discovery indicator for indicating the discovery of connectable APs. The display unit 130 can power off when the portable terminal 100 enters the sleep mode. The display unit 130 can be implemented with any of Liquid Crystal Display (LCD), Organic Light Emitted Diode (OLED), and Active Matrix OLED (AMOLED). In the case that the display unit 130 is implemented in the form of a touchscreen, the display unit 130 can operate as a part of the input unit 140.

The storage unit 120 is capable of storing Operating System (OS) of the portable terminal 100 and application programs associated with supplementary functions such as sound playback function, still and motion picture playback function, and broadcast playback function, and user data and application data generated in association with the application programs. For example, the storage unit 120 is capable of storing video files, game files, music files, movie files, etc. Particularly in an exemplary embodiment of the present invention, the storage unit 120 is capable of storing the AP list 20. The AP list 20 is capable of including the information on the APs to which the portable terminal 100 has connected previously. The AP information is capable of including SSID and authentication number. The AP list 20 can be transmitted to the Wi-Fi module 150 when the portable terminal 100 enters the sleep mode in the state that the Wi-Fi function is on. The storage unit 120 is also capable of storing the AP scan period and AP scan end time. The AP scan period and AP scan end time can be configured differently according to the system designer's intention.

The control unit 110 is capable of controlling overall operations and signal flows among the internal function blocks of the portable terminal 100 and processing data. For example, the control unit 110 can be a Central Processing Unit (CPU), a Micro-Processor Unit (MPU), or an Application Processor. Particularly in an exemplary embodiment of the present invention, the control unit 110 is capable of transferring the AP list 20 and the setup command to the Wi-Fi module 150 when the portable terminal 100 enters the sleep mode in the state where the Wi-Fi function is on. The setup command is the command for instructing the Wi-Fi module 150 to perform AP scan process and includes the information such as AP scan period and AP scan end time. That is, the control unit 110 is capable of handing over the AP scan control to the Wi-Fi module 150 when the portable terminal enters the sleep mode. As described above, exemplary embodiments of the present invention are characterized in that the Wi-Fi module 150 consumes relatively low power as compared to the control unit 110 in a portable terminal operating in the sleep mode.

If the wakeup command is received from the Wi-Fi module 150, the control unit 110 wakes up from the sleep mode to perform communication channel establishment procedure with the AP found by the Wi-Fi module 150 and then re-enters the sleep mode after establishment of the communication channel with the AP. Upon waking up from the sleep mode (e.g. power-on of the display unit 130), the control unit 110 stops the AP scan of the Wi-Fi module 150 and restarts the AP scan process by itself on behalf of the Wi-Fi module 150. That is, if the portable terminal 100 wakes up from the sleep mode (i.e. if the display unit 130 powers on), the control unit 110 withdraws the AP scan control right from the Wi-Fi module 150.

Although not depicted in FIG. 1, the portable terminal 100 is capable of further including at least one of Global Positioning System (GPS) module for receiving location information, Broadcast reception module for receiving broadcast signals, audio playback module such as MP3 module, Internet access module allowing for web browsing, and their equivalents. Although not enumerated herein, the portable terminal 100 according to an exemplary embodiment of the present invention is capable of including other components equivalent to the aforementioned components according to the tendency of digital device convergence.

FIG. 2 is a flowchart illustrating the AP scan method of the portable terminal according to an exemplary embodiment of the present invention.

Referring to FIGS. 1 and 2, the control unit 110 of the portable terminal 100 according to an exemplary embodiment of the present invention monitors the portable terminal 100 to detect the power-on of the Wi-Fi function at step 201. The control unit 110 waits until the Wi-Fi function powers on.

If the Wi-Fi function powers on, the control unit 110 determines whether a sleep mode entry request is input at step 203. The sleep mode is the operation mode for conserving battery power by deactivating most of the functions of the portable terminal 100 with the exception of a few essential functions. At this time, the display unit 130 powers off.

Until the sleep mode entry request is detected, the control unit 110 performs the function corresponding to the detected signal or event at step 205. For example, the control unit 110 is capable of performing AP scan at a predetermined AP scan period and establishing a communication channel with the found AP. If no AP is detected before the expiry of the scan end time, the control unit 110 is capable of stopping AP scan function for reducing unnecessary battery power consumption.

If the sleep mode entry request is detected, the control unit 110 retrieves the AP list 20 from the storage unit 120 at step 207. After retrieving the AP list 20, the control unit 110 transfers the AP list 20 and a setup command to the Wi-Fi module 150 at step 209 and enters the sleep mode at step 211. The setup command includes and AP scan period and an AP scan end time. When the portable terminal 100 enters the sleep mode, the control unit 110 is capable of handing over the AP scan control right to the Wi-Fi module 150. At this time, the motion sensor 170 is not deactivated but transfers the signal corresponding to the motion of the portable terminal 100 to the Wi-Fi module 150.

Upon receipt of the AP list 20 and the setup command, the Wi-Fi module 150 is capable of performing AP scan procedure at step 213. At this time, the Wi-Fi module 150 performs the AP scan at the predetermined AP scan period. The Wi-Fi module 150 is also capable of adjusting the AP scan period based on the signal transferred by the motion sensor 170, i.e. the motion information of the portable terminal 100. For example, the Wi-Fi module 150 scans APs at the predetermined AP scan period (first scan period) for the portable terminal 100 moving within the coverage of the AP, at the second scan period (e.g. 2-fold of the first scan period) for the portable terminal 100 moving out of the coverage of the AP, and at the third scan period (e.g. 2-fold of the second scan period) for the motionless portable terminal 100.

A brief description is made of the method for determining whether the portable terminal 100 is out of the coverage of the AP. Assuming that the AP has the radio coverage of 10 m and the distance between the AP and the portable terminal 100 is 7 m (which is calculated based on the Received Signal Strength Indicator (RSSI) of the AP), if the migration distance of the portable terminal 100 which is calculated based on the migration speed and time detected by the motion sensor 170 is longer than 3 m, the Wi-Fi module 150 determines that the portable terminal 100 moves out of the coverage of the AP. If the RSSI of the AP is equal to or less than a predetermined threshold value, the Wi-Fi module 150 is also capable of determining that the portable terminal 100 moves out of the coverage of the AP.

The Wi-Fi module 150 determines whether at least one AP is found at step 215. If no AP is found, the Wi-Fi module 150 determines whether an AP scan end event is detected at step 217. If no AP scan end event is detected, the Wi-Fi module 150 returns the procedure to step 215 and, otherwise if an AP scan end event is detected, stops the AP scan process. This is to reduce unnecessary battery power consumption by stopping the AP scan, by regarding, when no AP is detected in a predetermined time duration or a predetermined number of AP scan processes, when the portable terminal 100 is located in an area having no AP.

If an AP is found at step 215, the Wi-Fi module 150 generates a wakeup command and information on the found AP and sends to the control unit 110 at step 219. The wakeup command is the signal for waking up the control unit 100 from the sleep mode and can be an interrupt signal. Upon receipt of the wakeup command, the control unit 110 wakes up from the sleep mode at step 221 and establishes a communication channel with the found AP at step 223. In the case that the control unit 110 wakes up in response to the wakeup signal, the display unit 130 does not power on. After establishing the communication channel, the control unit 110 re-enters the sleep mode at step 225. At this time, since the portable terminal 100 has been connected to the found AP, the Wi-Fi module 150 stops scanning APs. As described above, exemplary embodiments of the present invention are capable of reducing unnecessary power consumption caused by wakeup of the control unit 110 for the AP scan process since the Wi-Fi module 150 performs the AP scan process on behalf of the control unit 110 in the sleep mode.

Although not depicted in FIG. 2, if the control unit 110 does not re-enter the sleep mode even after establishing the communication channel with the found AP, that is if the display unit 130 powers on, the AP control is handed over to the control unit 110. Meanwhile, if the connection to the AP is released in the state where the control unit 110 is not waken up from the sleep mode, the Wi-Fi module 150 is capable of performing the AP scan process again.

Figure 3A:
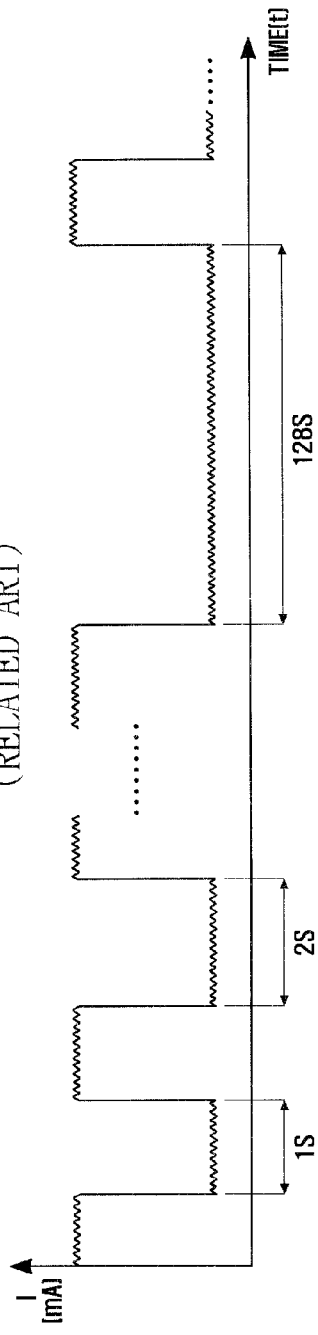
FIGS. 3A to 3C are diagrams illustrating the power consumption behaviors of the related art portable terminal and proposed portable terminal in sleep mode according to an exemplary embodiment of the present invention.
Figure 3B:
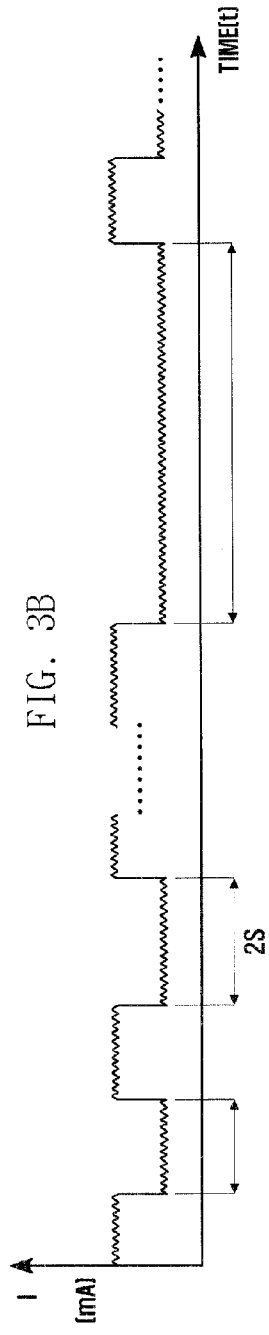
Figure 3C:
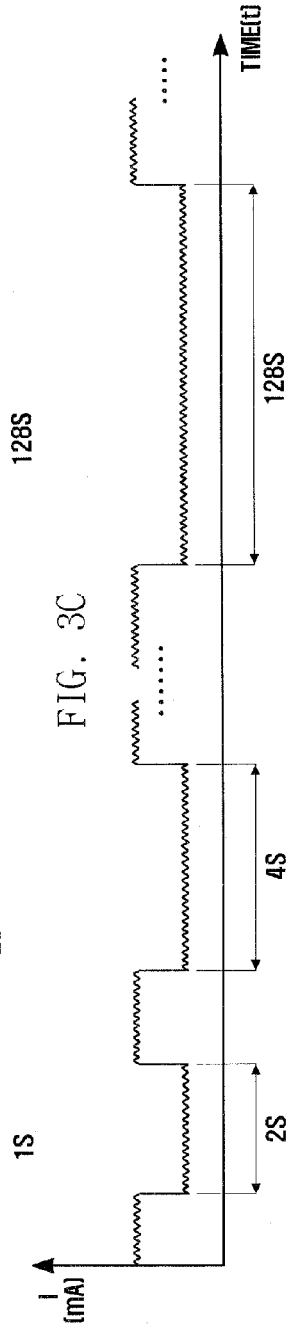

FIGS. 3A to 3C are diagrams illustrating the power consumption behaviors of the related art portable terminal and proposed portable terminal in sleep mode according to an exemplary embodiment of the present invention.

FIG. 3A is a graph illustrating the power consumption of the portable terminal in sleep mode according to the related art AP scan method, FIG. 3B is a graph illustrating the power consumption of the portable terminal in sleep mode with the first scan period of the proposed AP scan method, and FIG. 3C is a graph illustrating the power consumption of the portable terminal in sleep mode with the second scan period of the proposed AP scan method.

Comparing the graphs of FIGS. 3A, 3B and 3C among each other, it is shown that the portable terminal 100 in sleep mode, which performs the AP scan according to an exemplary embodiment of the present invention, consumes relatively low power as compared to the related art portable terminal. This is because the portable terminal 100 according to an exemplary embodiment of the present invention performs the AP scan process, in sleep mode, by means of the Wi-Fi module 150 which consumes low power as compared to the controller 110. Referring to FIGS. 3B and 3C, although there is a small increase of power consumption due to the operation of the motion sensor 170, this increase is negligible from the viewpoint of the entire power consumption amount. In an exemplary case of using the acceleration sensor, about 40 micro amperes (uA) of electric current are consumed by the acceleration sensor. That is, the AP scan method according to an exemplary embodiment of the present invention is capable of reducing the power consumption by using the Wi-Fi module 150 for scanning AP in a sleep mode and further by elongating the scan period as shown in FIG. 3C when it is not necessary to perform AP scanning frequently.

Although the description has been directed to the case where the AP scan process is controlled by the control unit 110 or the Wi-Fi module 150 selectively depending on whether the portable terminal 100 operates in the sleep mode, the exemplary embodiments of the present invention are not limited thereto. For example, the exemplary embodiments of the present invention can be implemented in such a way that the AP scan process is controlled by the control unit 110 or the Wi-Fi module 150 selectively depending on whether the display unit 130 is turned on or off As described above, the portable terminal and AP scan method thereof according to the described exemplary embodiments of the present invention are characterized in that the AP scan process is controlled by the short range radio communication module on behalf of the processor in the sleep mode. Since the sleep mode AP scan process is controlled by the short range radio communication module consuming relatively low power as compared to the processor, it is possible to conserve the battery power of the portable terminal.

Also, the portable terminal and AP scan method thereof according to the exemplary embodiments of the present invention are capable of checking the motion of the portable terminal in the sleep mode through the acceleration sensor and performing AP scanning at the first period (default period) when the portable terminal is moving within the coverage of the AP and at an elongated period (the second period) when the portable terminal 100 is moving out of the coverage of the AP and at a more elongated period (the third period) when the portable terminal is motionless, resulting in reduction of power consumption.

The above-described AP scan method according to an exemplary embodiment of the present invention can be recorded in a computer-readable storage media in the form of program commands executable by means of various types of computing means. Here, the computer-readable storage media can store the program commands, data files, and data structures independently or in the form of their combination. The program commands recorded in the storage media can be designed and configured for dedicated use in the exemplary embodiments of the present invention or the ones well-known to those in the computer software field. The computer-readable media may be magnetic media such as a hard disk, a floppy disk and magnetic tape, optical media such as a Compact Disk Read-Only Memory (CD-ROM) and a Digital Versatile Disk (DVD), magneto-optical media such as floptical disk, and hardware devices such as a ROM, a Random-Access Memory (RAM), a flash memory, etc., particularly implemented to store and execute program commands. The program commands may be machine language codes produced by a compiler and high-level language codes that can be executed by computers using an interpreter, etc. In order to perform the operations of the exemplary embodiments of the present invention, the hardware devices may be implemented to operate as at least one software module, and vice versa.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An access point scan method of a portable terminal, the method comprising:
   checking whether a sleep mode entry request is detected in a state that a short range radio communication function is activated;
   transmitting, when the sleep mode entry request is detected, an access point list and a setup command for handing over an access point scan control from a control unit to a short range radio communication module;
   entering, by the control unit, the sleep mode after transmitting the access point list and the setup command to the short range radio communication module;
   adjusting, by the short range radio communication module, a scan period according to a motion of the portable terminal while the control unit is in the sleep mode in response to a reception of the setup command;
   scanning, by the short range radio communication module, access points based on the adjusted scan period and the access point list;
   transmitting, when a connectable access point is found, a wakeup signal for waking up the control unit and information on the found access point from the short range radio communication module to the control unit;
   attempting, by the control unit, establishment of a communication channel to the found access point; and
   re-entering, by the control unit, the sleep mode when the communication channel to the found access point is established successfully.

2. The method of claim 1, wherein the setup command comprises the scan period for scanning access points and a scan end time.

3. The method of claim 2, wherein the scanning of the access points at the scan period comprises stopping, when no access point is found before the scan end time, scanning access points.

4. The method of claim 3, wherein the adjusting of the scan period comprises determining, when any motion of the portable terminal is detected, whether the portable terminal is located in a coverage area of the access point to which the portable terminal is connected.

5. The method of claim 4, wherein the adjusting of the scan period comprises:
   setting, when the portable terminal is moving in the coverage area of the access point, the scan period to a first scan period;
   elongating, when the portable terminal is moving out of the coverage area of the access point, the first scan period to a second scan period longer than the first scan period; and
   elongating, when the portable terminal is motionless, the first scan period to a third scan period longer than the second scan period.

6. The method of claim 1, further comprising:
   stopping, when the control unit wakes up from the sleep mode, access point scan of the short range radio communication module; and
   starting, at the control unit, the access point scan.

7. A portable terminal comprising:
   an input unit configured to receive a short range radio communication function on/off signal;
   a storage unit configured to store an access point list including information on access points to which the portable terminal has connected previously;
   a control unit configured to transmit, when the sleep mode entry request is detected in a state that a short range radio communication function is activated, the access point list and a setup command for handing over an access point scan control and enters the sleep mode;
   a motion sensor configured to detect a motion of the portable terminal while the control unit is in the sleep mode; and
   a short range radio communication module, configured to:
      adjust, when the access point list and the setup command are received, a scan period according to the detected motion of the portable terminal, scan access points based on the access point list and the adjusted scan period while the control unit is in the sleep mode, and transmit, when a connectable access point is found, a wakeup signal for waking up the control unit and information on the found access point to the control unit, wherein the control unit is further configured to:

attempt, when the wake-up signal is received, establishment of a communication channel to the found access point, and re-enter, when the communication channel to the found access point is established successfully, the sleep mode.

8. The portable terminal of claim 7, wherein the setup command comprises the scan period for scanning access points and a scan end time.

9. The portable terminal of claim 8, wherein the short range radio communication module is further configured to:

scan adjacent access points at the scan period, and stop, when no access point is found before the scan end time, scanning access points.

10. The portable terminal of claim 9, wherein the short range radio communication module is further configured to determine whether the portable terminal is located in a coverage area of the connected access point based on migration speed and migration time of the portable terminal which are transmitted by the motion sensor.

11. The portable terminal of claim 10, wherein the short range radio communication module, is further configured to:

set, when the portable terminal is moving in the coverage area of the access point, the scan period to a first scan period, elongate when the portable terminal is moving out of the coverage of the access point, the first scan period to a second scan period longer than the first scan period, and elongate when the portable terminal is motionless, the first scan period to a third scan period longer than the second scan period.

12. The portable terminal of claim 7, wherein the control unit is further configured to command, when the control unit wakes up from the sleep mode, the short range radio communication module to stop the access point scan and start the access point scan.

13. The portable terminal of claim 7, wherein the short range radio communication module is further configured to consume relatively low electric current as compared to the control unit.

14. The portable terminal of claim 7, wherein the short range radio communication module is a Wi-Fi module.

15. The portable terminal of claim 7, wherein the access point list comprises service set identifiers and authentication numbers of respective access points.

16. A method of scanning for access points of a portable terminal, the method comprising:

activating a short range radio communication function of the portable terminal;

detecting whether a sleep mode entry request is received when the short range radio communication function of the portable terminal is activated;

retrieving an access point list when the sleep mode entry request is received and transmitting the access point list and a setup command from a control unit of the portable terminal to a short range radio communication module of the portable terminal for handing over an access point scan control;

entering, by the control unit, the sleep mode after transmitting the access point list and the setup command to the short range radio communication module;

adjusting, by the short range radio communication module, a scan period for scanning the access points of the portable terminal according to a motion of the portable terminal while the control unit is in the sleep mode in response to a reception of the setup command;

scanning, by the short range radio communication module, the access points based on the access point list and the adjusted scan period;

transmitting, when a connectable access point is found, a wakeup signal for waking up the control unit and information on the found access point from the short range radio communication module to the control unit;

attempting, by the control unit, establishment of a communication channel to the found access point; and re-entering, by the control unit, the sleep mode when the communication channel to the found access point is established successfully.

17. The method of claim 16, wherein the setup command comprises the scan period for scanning the access points and a scan end time.

18. The method of claim 17, wherein adjusting of the scan period comprises determining, when any motion of the portable terminal is detected, whether the portable terminal is located in a coverage area of an access point to which the portable terminal is currently connected.

* * * * *